United States Patent
Beyda et al.

(10) Patent No.: US 7,120,927 B1
(45) Date of Patent: Oct. 10, 2006

(54) SYSTEM AND METHOD FOR E-MAIL ALIAS REGISTRATION

(75) Inventors: Cathy Sue Beyda, Cupertino, CA (US); William J. Beyda, Cupertino, CA (US); Shmuel Shaffer, Palo Alto, CA (US)

(73) Assignee: Siemens Communications, Inc., Boca Raton, FL (US)

( * ) Notice: Subject to any disclaimer, the term of this patent is extended or adjusted under 35 U.S.C. 154(b) by 0 days.

(21) Appl. No.: 09/329,089

(22) Filed: Jun. 9, 1999

(51) Int. Cl.
*H04L 9/32* (2006.01)
*H04L 9/00* (2006.01)
*G06F 9/00* (2006.01)
*G06F 15/16* (2006.01)

(52) U.S. Cl. .............................. 726/2; 726/11; 726/12; 713/153; 713/162; 713/163; 709/206

(58) Field of Classification Search ................ 713/201, 713/153, 162, 163; 709/206; 726/2, 11, 726/12
See application file for complete search history.

(56) References Cited

U.S. PATENT DOCUMENTS

| 5,732,137 A | 3/1998 | Aziz |
| 5,748,738 A | 5/1998 | Bisbee et al. |
| 5,790,793 A | 8/1998 | Higley |
| 5,793,972 A | 8/1998 | Shane |
| 5,884,272 A | 3/1999 | Walker et al. |
| 5,937,160 A * | 8/1999 | Davis et al. ................. 709/203 |
| 5,961,593 A * | 10/1999 | Gabber et al. .............. 713/153 |
| 6,366,950 B1 * | 4/2002 | Scheussler et al. ......... 709/206 |
| 6,463,533 B1 * | 10/2002 | Calamera et al. ........... 713/163 |

\* cited by examiner

*Primary Examiner*—Emmanuel L. Moise
*Assistant Examiner*—Courtney Fields

(57) ABSTRACT

An e-mail alias registration system is provided. According to one embodiment, users may register an e-mail address and a password at an alias relay server (102). Then, when a third party attempts to reply to the registered user, the third party will be presented with a sign on screen. Only if the sender is himself or herself a registered user will e-mail be allowed to be sent directly. To ensure that spammers do not abuse the registration system, only a limited number of e-mails will be allowed to be sent by registered users per day. Also, in order to register, a credit card number or other affirmative identification may need to be provided.

20 Claims, 8 Drawing Sheets

Relay Server

PARTY DATA DATABASE 255 (PDDB)

| FIELD NAME | FIELD CHARACTERISTIC |
|---|---|
| PARTY ID | UNIQUE ALPHANUMERIC |
| NAME | TEXT |
| PSEUDONYM LIST | TEXT LIST OF PSEUDONYMS USED TO RELATE TO THIS PARTY |
| ADDRESS | TEXT |
| PHONE | TEXT |
| E-MAIL | TEXT |
| AUTHORIZATION PROFILE | TEXT |

REQUESTOR DATA DATABASE 260 (RDDB)

| FIELD NAME | FIELD CHARACTERISTIC |
|---|---|
| REQUESTOR ID | UNIQUE ALPHANUMERIC |
| NAME | TEXT |
| PSEUDONYM LIST | TEXT LIST OF PSEUDONYMS USED TO RELATE TO THIS REQUESTOR |
| ADDRESS | TEXT |
| PHONE | TEXT |
| E-MAIL | TEXT |
| AUTHORIZATION PROFILE | TEXT |

FIG. 3A

SYSTEM AND METHOD FOR E-MAIL ALIAS REGISTRATION

BACKGROUND OF THE INVENTION

1. Field of the Invention

The present invention relates to telecommunications systems and, particularly, to e-mail alias registration.

2. Description of the Related Art

Unsolicited e-mail or "spam" is a problem of increasing scope. Often, spammers (those who generate such unsolicited e-mail) obtain users' e-mail addresses using mail bots that troll for e-mail addresses in chat rooms, bulletin boards and news groups.

Users of chat rooms, bulletin boards and news groups can decrease the likelihood of receiving spam by not posting or by posting under a nonexistent address, such that if someone sends spam to the address, it won't go anywhere. Such precautions, however, prevent users from being able to use the Internet to its fullest extent.

Alternatively, various methods for blocking or filtering spam e-mail are known. For example, sophisticated users can block their SMTP (simple mail transfer protocol) port to reject e-mail received from a particular site or within a particular range of IP addresses. However, the ordinary user is typically not capable of configuring his system in such a manner. A number of other filtering methods, either by Mail Transfer Agents (MTA) or Mail User Agents (MUA) are known, but again, may require relatively sophisticated configuration procedures. Moreover, spammers are increasingly using third party relaying such that the spam appears to be received from an innocent site. In such cases, further measures must be taken.

Anonymous servers are known, whereby a user may be assigned an e-mail alias and a password. To send e-mail, the user must enter the password as part of the message and direct it to the server (as well as the "true" destination. The anonymous server then strips off identification information and directs the e-mail appropriately. Reply e-mails sent to the e-mail alias are directed to the user's "true" e-mail address. Such servers may be moderated such that the server provider will manually attempt to filter spam. However, manual filtering is not necessarily effective and can be prohibitively time consuming.

SUMMARY OF THE INVENTION

These disadvantages in the prior art are overcome in large part by a system and method according to the present invention. In particular, an e-mail alias registration system is provided. According to one embodiment, users may register an e-mail address and a password at an alias relay server. Then, when a third party attempts to reply to the registered user, the third party will be presented with a sign on screen. Only if the sender is himself or herself a registered user will e-mail be allowed to be sent directly. To ensure that spammers do not abuse the registration system, only a limited number of e-mails will be allowed to be sent by registered users per day. Also, in order to register, a credit card number or other affirmative identification may need to be provided.

According to another embodiment of the invention, the third party user may sign on or register and then enter e-mail via a web-based form. The e-mail is then relayed to the other party's actual e-mail address. Another embodiment of the invention provides an anonymous e-mail forum for a chat room or news group. For example, in order to use the forum, users must register an alias e-mail.

According to still another embodiment of the invention, a registered user attempting to send e-mail to another registered user will generate a token or permission slip, such as a password or other identification. The relay server receives the password or token and allows the accompanying e-mail to pass only if the password identifies the user as authorized. If no password accompanies the e-mail to a registered user, a reply e-mail may be sent and the sender given the chance to register.

BRIEF DESCRIPTION OF THE DRAWINGS

A better understanding of the invention is obtained when the following detailed description is considered in conjunction with the following drawings in which:

FIGS. 3A and 3B illustrate exemplary database fields for an embodiment of the invention;

DETAILED DESCRIPTION OF THE INVENTION

Figure 1:
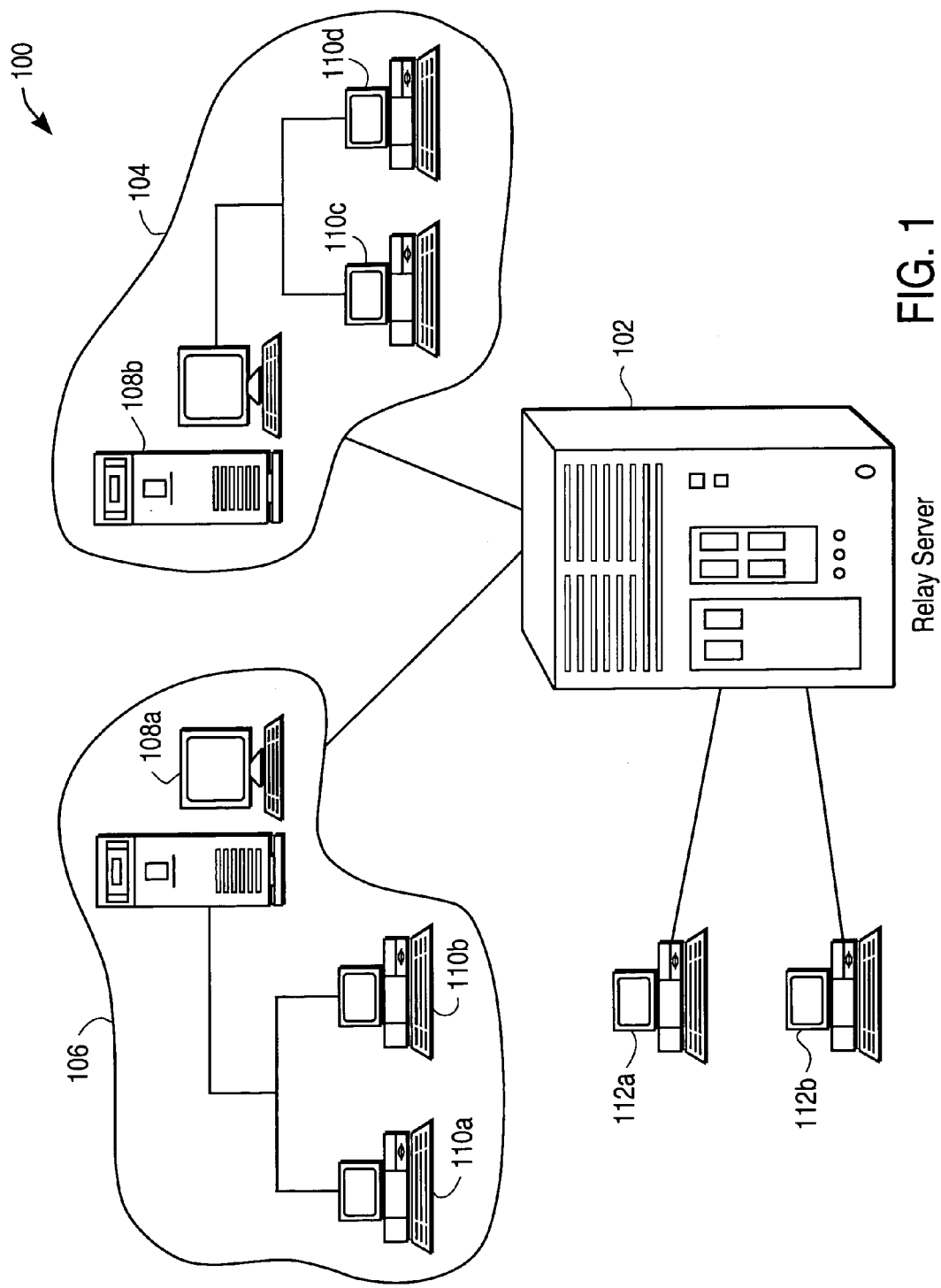
FIG. 1 is a diagram illustrating a telecommunications system according to an embodiment of the invention.

Turning now to the drawings and with particular attention to FIG. 1, an exemplary telecommunications system 100 according to an embodiment of the present invention is shown. The telecommunications system 100 includes a relay server 102 according to the present invention. One or more user networks 106, 104 may be coupled to communicate with the relay server 102, as will be described in greater detail below. The user networks 104, 106 include servers 108a, 108b, respectively, and one or more user terminal or computers 110a, 110b, 110c, 110d, as are known. In addition, individual user terminals or computers 112a, 112b may be coupled to communicate with the relay server 102. Typically, the user networks 104, 106 are packet networks or LANs or Intranets. The relay server 102, the networks 104, 106 and the users 112a, 112b may communicate with one another using any of a variety of protocols, such as TCP/IP. The relay server 102 according to the present invention is configured to allow a user (either an individual user or a user of one of the networks 104, 106) to login and register an alias e-mail address. More particularly, the server 102 allows users to select a password and an e-mail alias such that e-mail or newsgroup postings sent from the user go via the alias name.

Figure 2:
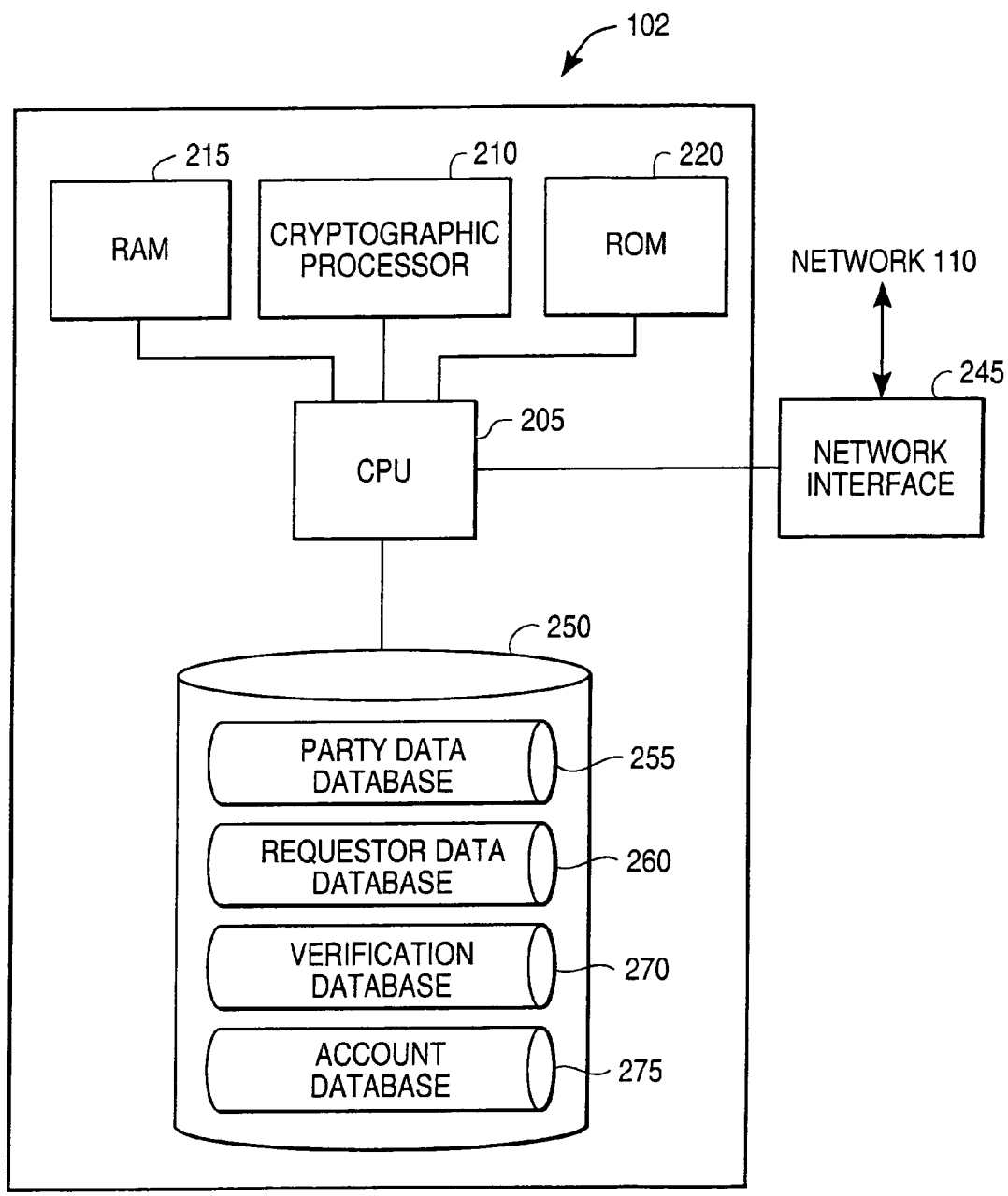
FIG. 2 is a block diagram illustrating a relay server according to an embodiment of the invention.

A block diagram of an exemplary relay server 102 according to an embodiment of the invention is shown in FIG. 2.

Coupled to a network 110 via network interface 245, the relay server 112 includes a CPU 205 which is coupled to a random access memory (RAM) 215, a read only memory (ROM) 220, a network interface 245, a data storage device 250, and in certain embodiments, a cryptographic processor 210. The data storage device 250 includes a plurality of databases, including a party database 255, a requester database 260, a verification database 270 and an account database 275, as well as program instructions (not shown) for the CPU 205.

Figure 3B:
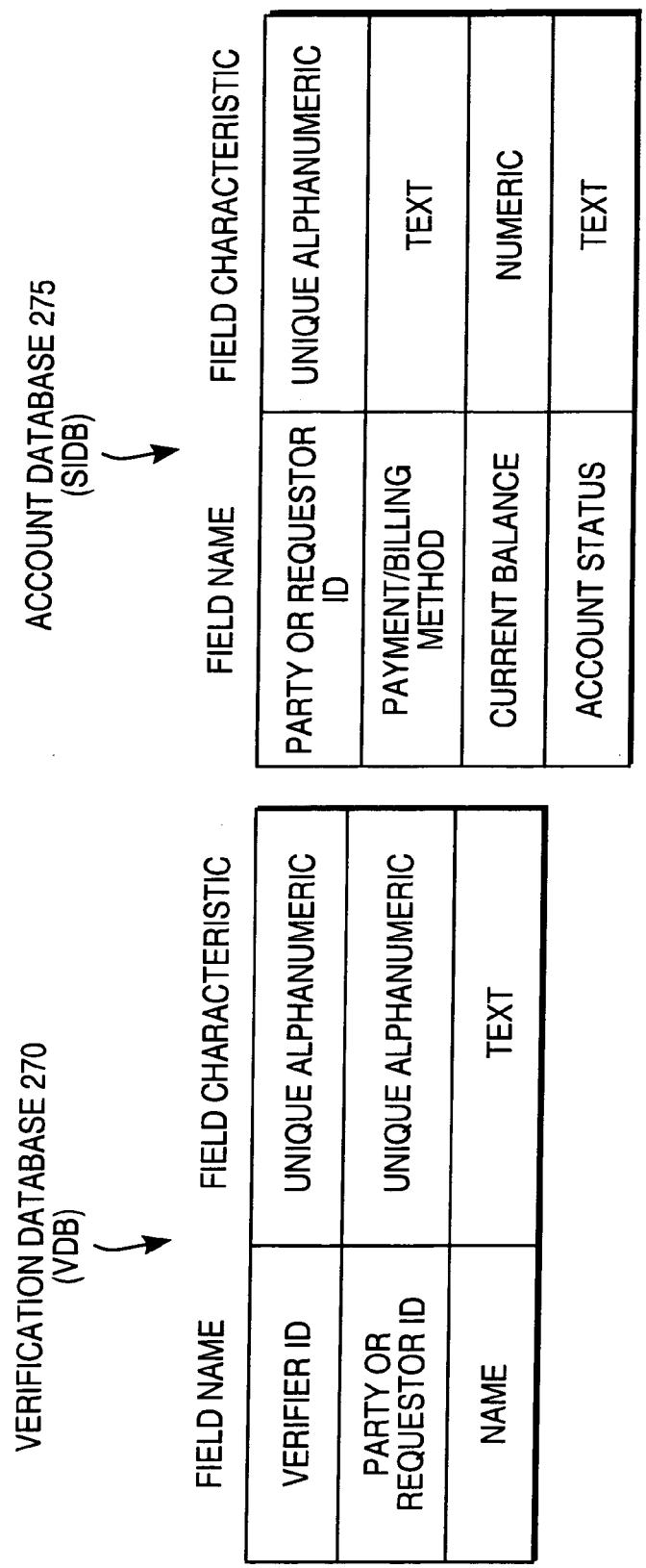

The databases in the data storage device 250 may be implemented as standard relational databases capable of, for example, supporting, searching, and storing text information. FIG. 3A illustrates exemplary record layouts for a party data database 255 and a requester data database 260, and FIG. 3B illustrates record layouts for the verification database 270 and the account database 275. Each record layout may be embodied as a two-dimensional array of information with one column for "Field Name" and another column for "Field Characteristic." The rows correspond to respective fields.

The "authorization profile" field contained in each of the party data and requestor data databases may include a list of rules for allowing e-mail to be transmitted through to the party's "true" e-mail account. For example, according to one embodiment, the party user may select or input a third party's e-mail which is authorized to access the e-mail account. Similarly, the party may provide that a third party's e-mail is allowed through only on particular dates or times.

The verification database 270 is used by the relay server 102 to determine whether a requestor is an authorized user, as will be discussed in greater detail below. The verification database 270 includes cross-referencing fields (not shown) to the party data database 255 and the requester data database 260.

The CPU 205 executes program instructions stored in the RAM 215, ROM 220, and data storage device 250 to perform various functions described below. In one embodiment, the CPU 205 is programmed to maintain data, including party data and requester data, in the data storage device 250. The CPU 205 receives party data and requestor data from the network through the network interface 245 and stores the received party data and requestor data in the databases 255 and 260, respectively. The CPU 205 is also programmed to receive and store information in the party database 255, the requestor database 260 the verification database 270 indicating whether submitted e-mails are authorized to go through. Upon receipt of an e-mail, the CPU 205 determines whether the requester is an authorized user, by accessing the verification database 270, as will be discussed in greater detail below. If so, the CPU 205 determines where to forward the e-mail.

The CPU 205 is programmed to search the databases 255, 260, and 270. When the CPU 205 receives an e-mail request, the CPU 205 searches the databases of the data storage device 250 to determine whether the requester is an authorized user and if so, whether the party to whom the e-mail is directed has allowed the requestor access privileges. Based upon the search, CPU 205 allows e-mail to go through.

Also, the CPU 205 assigns pseudonyms or e-mail aliases to each registered party and requester, and stores the pseudonyms in the databases 255 and 260, respectively. Such pseudonyms or aliases are generally of the form alias@relaysite.com, where alias is the selected alias and relaysite.com is the domain name of the relay service site.

The CPU 205 may be embodied as a conventional high-speed processor capable of executing program instructions to perform the functions described herein. Although the central controller 200 is described as being implemented with a single CPU 205, in alternative embodiments, the central controller 200 could be implemented with a plurality of processors operating in parallel or in series.

The RAM 215 and ROM 220 may be standard commercially-available integrated circuit chips. The data storage device 250 may be embodied as static memory capable of storing large volumes of data, such as one or more floppy disks, hard disks, CDs, or magnetic tapes.

The network interface 245 connects CPU 205 to the network 110. The network interface 245 receives data streams from CPU 205 and network 110 formatted according to respective communication protocols. Interface 245 reformats the data streams appropriately and relays the data streams to the network 110 and the CPU 205, respectively. The interface 245 may accommodate several different communication protocols.

In certain embodiments, the cryptographic processor 210 is programmed to encrypt, decrypt, and authenticate the stored data in each of the databases described above. The cryptographic processor 210 encrypts and decrypts data received by and transmitted from CPU 205. In one preferred embodiment, all party data and requestor data are encrypted before being transmitted onto network 110. Also, the cryptographic processor 210 encrypts the data before the CPU 205 transmits such data via network 110. Any encrypted data received by CPU 205 is decrypted by processor 210. Any known cryptographic protocols may be used by the cryptographic processor. Further, it is noted that the functionality provided by the cryptographic processor 210 may also be implemented by the CPU 205 itself.

Figure 4:
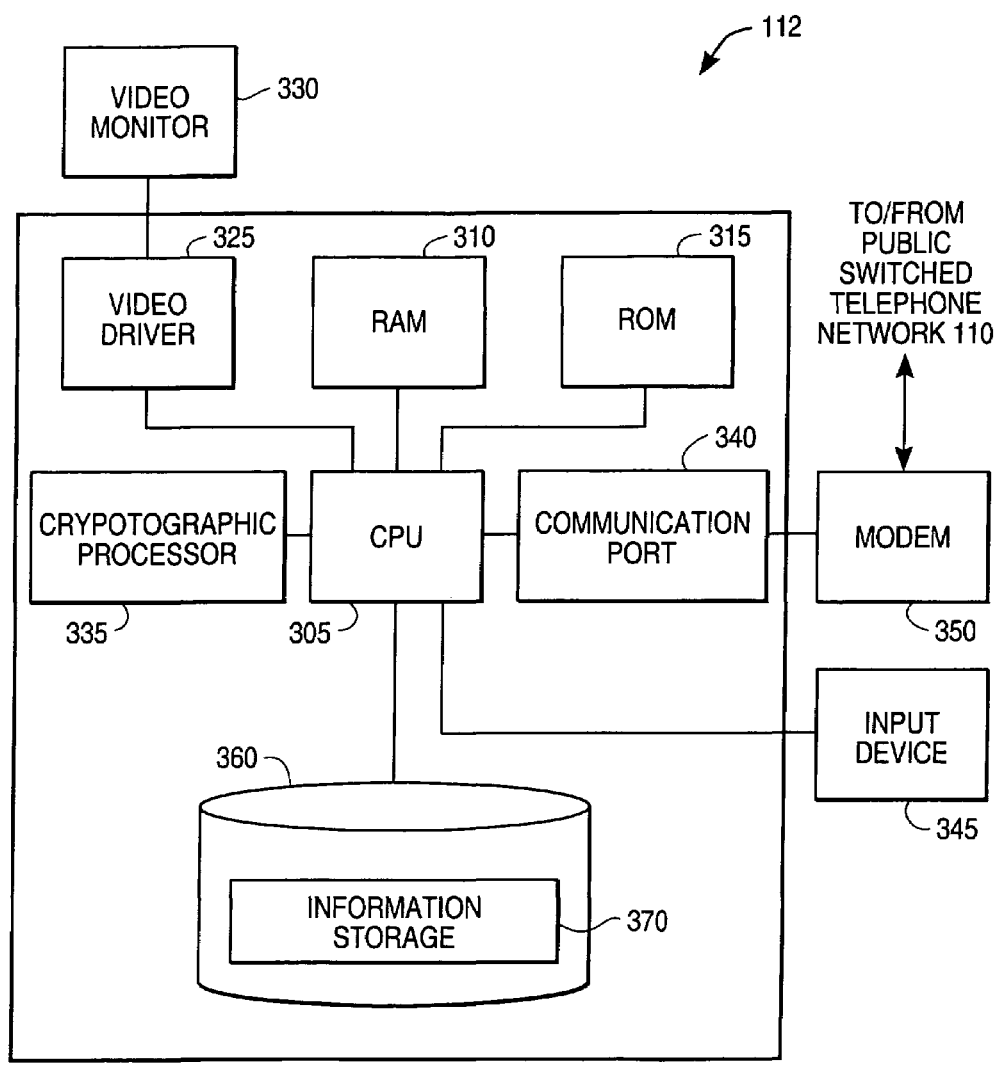
FIG. 4 is a block diagram of a user terminal according to an embodiment of the invention.

FIG. 4 illustrates a block diagram of a party or requestor terminal 112, according to one embodiment of the invention. The terminal 300 includes a CPU 305, which is connected to RAM 310, ROM 315, a video driver 325, a cryptographic processor 335, a communication port 340, an input device 345, and a data storage device 360. A video monitor 330 is connected to the video driver 325, and a modem 350 is connected to the communication port 340 and the network 110 (for example, the public switched telephone network).

The CPU 305 executes program instructions stored in RAM 310, ROM 315, and the information storage 370 to carry out various functions associated with terminal 112. In one embodiment, the CPU 305 is programmed to receive data from the input device 345, receive data from the communication port 340, output received data to video driver 325 for display on the video monitor 330, and output data to the communication port 340 for transmission by the modem 350. In addition, in one embodiment, the CPU 305 may transmit the data to the cryptographic processor 335 for encryption before outputting the data to the communication port 340 for transmission to the network 110. In this embodiment, when the CPU 305 receives encrypted data, the CPU 305 transmits the encrypted data to the cryptographic processor 335 for decryption.

The CPU 305 may be embodied as a high-speed processor capable of performing the functions described herein. The RAM 310 and ROM 315 may be embodied as standard commercially-available integrated circuit chips. The information storage 370 may be static memory capable of storing large volumes of data, such as one or more floppy disks, hard disks, CDs, or magnetic tapes. The information storage 370 stores program instructions and received data.

The video driver 325 relays received video and text data from the CPU 305 to the video monitor 330 for display. The video monitor 330 may be a high resolution video monitor capable of displaying both text and graphics. The cryptographic processor 335 encrypts and decrypts data in accordance with conventional encryption/decryption techniques and may be capable of decrypting code encrypted by the cryptographic processor 210. The communication port 340 relays data between the CPU 305 and the modem 350 in accordance with conventional techniques. The modem 350 may be a high-speed data transmitter and receiver such as a conventional analog modem or a digital terminal device such as an ISDN terminal adapter. The input device 345 may be any data entry device for allowing a party to enter data, such as a keyboard, a mouse, a video camera, or a microphone. The operation of a party terminal 112a and a requestor terminal 112b is described in greater detail in connection with FIGS. 5–9.

Figure 5:
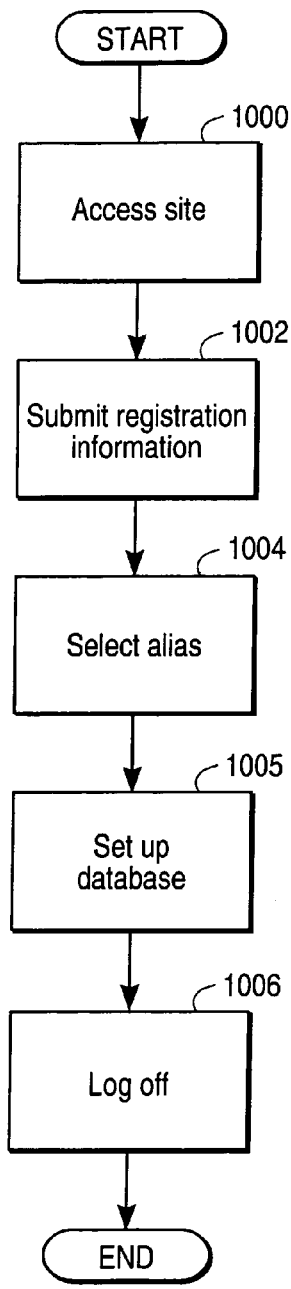
FIG. 5 is a flowchart illustrating registration procedures according to an embodiment of the invention.

The user of the e-mail account may register with the relay server for an e-mail alias as described with reference to FIG. 5. In particular, in a step 1000, a user 112a may access a web site hosted by the relay server 102 in a known manner. Thus, for example, the CPU 305 (FIG. 4) may issue identification data and the like out the communication port 340, via the modem 350 to the network interface 245 of the relay server 205. The CPU 205 (FIG. 2) reads the request and downloads a log in web page to the user 112a, which is displayed on the video monitor 330. The relay server 102 for example, may support HTML documents, as well as Java, Javascript and cgi-bin script. Similarly, the user terminal 112a may be able to read HTML documents and support Java, as well as read forms generated by cgi-bin script or Javascript.

Next, in a step 1002, the user registers with the relay server 102. This may, for example, include the submission of name and address information, which is stored in an account database 275, which the CPU 205 sets up in the data storage 250. The user 112a may also submit credit card information to pay for use of the service. Next, in a step 1004, the user 112a enters an e-mail alias or pseudonym, which will be used for communication via the relay server 102. The CPU 205 receives the user-selected e-mail alias (and current e-mail address) and stores them in a party database 250 set up in the memory 250. It is noted that all such information that is submitted may be encrypted and decrypted using the cryptographic processors 210, 335. The CPU 205 uses this information to set up entries in the party database 255 and the verification database 270, identifying the party as an authorized user, in a step 1005. Finally, in a step 1006, the user may exit or log off from the web site.

Figure 6:
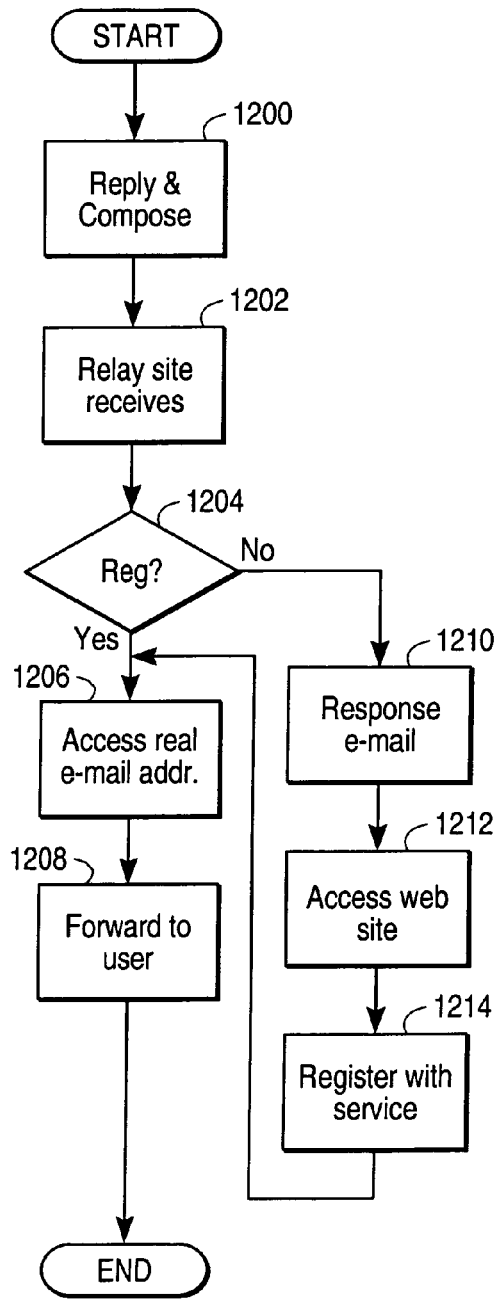
FIG. 6 is a flowchart illustrating system operation according to an embodiment of the invention.

As discussed above, the user may now use the e-mail alias as an e-mail address when posting to news groups or bulletin boards or engaging in discussions in a chat room. The relay server 110 will intercept response e-mails directed to the alias or pseudonym and will require the sender or requestor to register with the relay server 110 or the e-mail will be discarded. For example, FIG. 6 illustrates the process wherein a first user (User A) has registered as described above and is using an e-mail alias and a second user or requestor (User B) attempts to send an e-mail response to the listed (alias) e-mail address. In a step 1200, the User B clicks "Reply" or types in the User A's alias e-mail address into his or her e-mail program, composes an e-mail and transmits the composed message. In a step 1202, the relay site 102 and, in particular, the CPU 205 receives the message via the network interface 245. The CPU 205 reads the e-mail address of the sender in a known manner and accesses the verification database 270. If the User B is already registered with the site (and, in one embodiment, if the User A has listed the User B as an approved party), as determined in a step 1204 by accessing the verification database 270 for the e-mail address of the User B, the CPU 205 will then access the party database 255 for the User A's "real" e-mail address, in a step 1206. The e-mail will then go through to the User A's real e-mail address in a step 1208.

If, however, in step 1204, the User B was determined not to be registered, the CPU 205 will send a response e-mail to the User B, in a step 1210. For example, the CPU 205 may access a file in the data storage device 250 containing a stored, form response. The response will inform the User B that User A is registered with the relay service and that, if the User B wishes for the e-mal to go through, the User B will also have to register. The response e-mail may also include the URL (Uniform Resource Locator), as hypertext, of the relay server 102's hosted web site. In a step 1212, the User B may access the relay service web site, for example, by clicking on a hypertext URL embedded in the response e-mail. In a step 1214, the User B may register with the service, in the manner described above with regard to FIG. 5, a requestor database for User B will be generated at this time. The e-mail will then go through, in steps 1206 and 1208.

Figure 7:
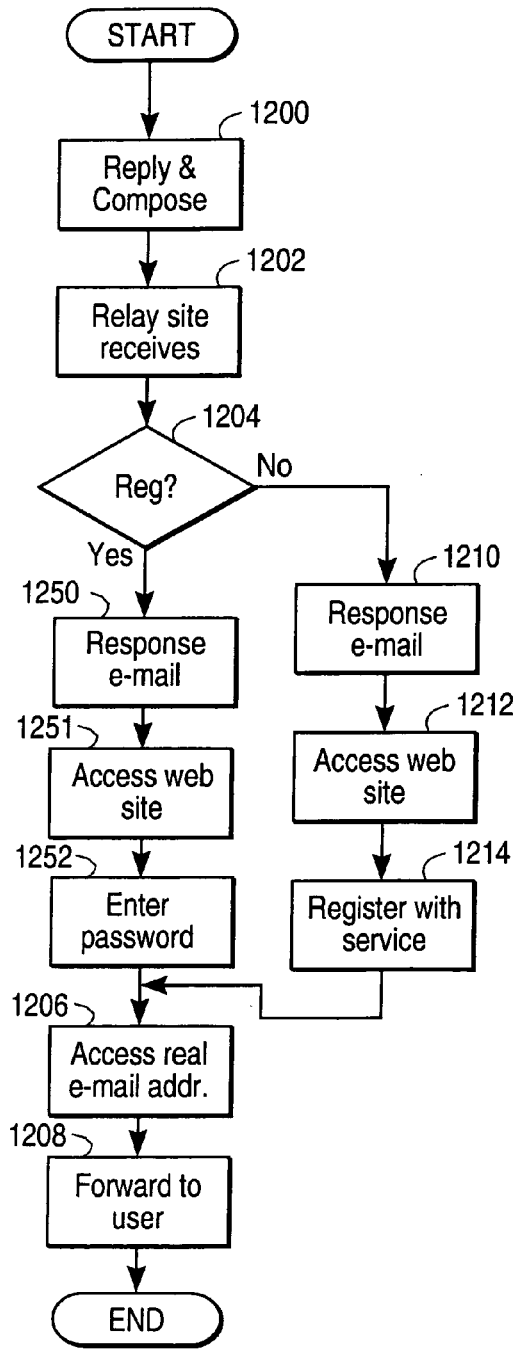
FIG. 7 is a flowchart illustrating system operation according to another embodiment of the invention.

In one embodiment, illustrated in FIG. 7, the User B's e-mail is not routed automatically to the User A, even if the User B is registered. It may be advantageous for deterring spammers, for example, to require the User B to manually enter a password prior to completion of the communication. The flowchart of FIG. 7 is generally similar to that of FIG. 6, but with additional steps 1250–1252 interposed between steps 1204 and 1206. Thus, for example, after step 1204 of FIG. 6, a step 1250 may be required, in which a response e-mail is sent to the User B. The response e-mail contains the URL of the relay site and informs the User B that, as a registered user, he must log on in order to complete his e-mail. In a step 1251, the User B accesses the web site in a known manner and enters a password into, for example, a secure form, in a step 1252. The CPU 205 then proceeds to step 1206, as described above for FIG. 6.

Figure 8:
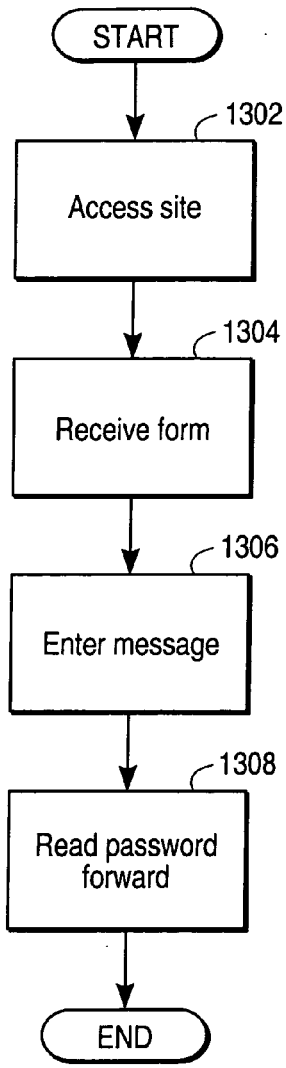
FIG. 8 is a flowchart illustrating system operation according to another embodiment of the invention.

Use of a method according to a still further embodiment of the invention is shown with respect to FIG. 8. More particularly, the User B may already be aware that the User A is registered with a relay service, for example, either by recognizing the domain name of the e-mail address, or by instructions (including a hypertext URL) included within the User A's posting. In this case, in a step 1302, the User B may access the relay server's web site by clicking on the hypertext URL or by manually entering an URL in a web browser program running on the CPU 305. In a step 1304, the relay server 102 and, particularly, the CPU 205 downloads to the User B a web-based form (e.g., a guestbook type form) viewable on the video monitor 330 to allow the User B to enter an e-mail message and a password (if already registered). In a step 1306, the User B uses an input device 345 to enter a message and the User B's password in the form. The CPU 305 transmits the filled in form via the communication port 340 and the modem 350 to the relay server 102. The relay server 102 and, particularly, the CPU 205 reads the User B's password and accesses the verification database 270. If the user B is registered, the e-mail will go through to the User A as described above, in a step 1308. If the User B had not been registered, the web form would provide the User B with an option to register, as described above. Again, it is noted that all submissions to and from the relay server 102 may be encrypted suing the cryptographic processors.

Figure 9:
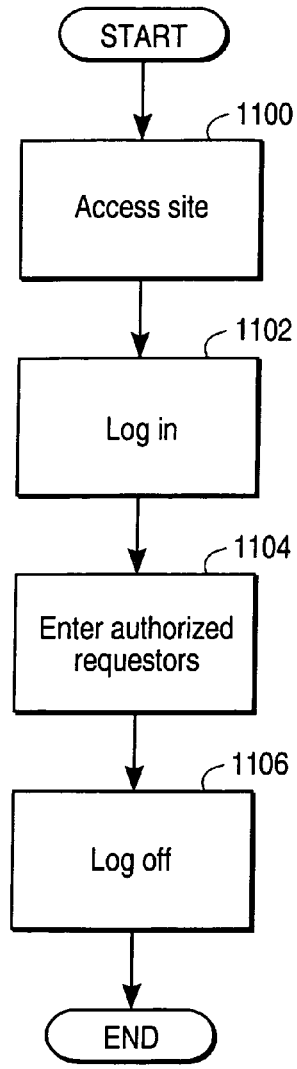
FIG. 9 is a flowchart illustrating entry of user selected authorized requestors according to another embodiment of the invention.

As noted above, one embodiment of the invention permits the user of a relay server account to provide a list of e-mail users who are authorized to send e-mail to other users. In this way, parties who are sending need not necessarily provide a log in (or alternatively, will be required to be on the list). This is shown in the flowchart of FIG. 9. In a step 1100, the user (for example, User A) accesses the relay service's web site in a known manner. In a step 1102, the User A accesses his account by entering his password and user name. The CPU 205 compares the password with the information in the party data database 255 and allows the User A to access an "account update" portion of the web page. For example, the CPU 205 could display a web or cgi-bin based form to allow entry of authorized requestor information. In a step 1104, the User A enters the e-mail addresses of authorized requestors. The e-mail addresses are stored by the CPU 205 in the verification database 270. As discussed above, the verification database 270 is searched when a requestor attempts to send an e-mail to User A. Finally, in a step 1106, the User A may exit.

Figure 10:
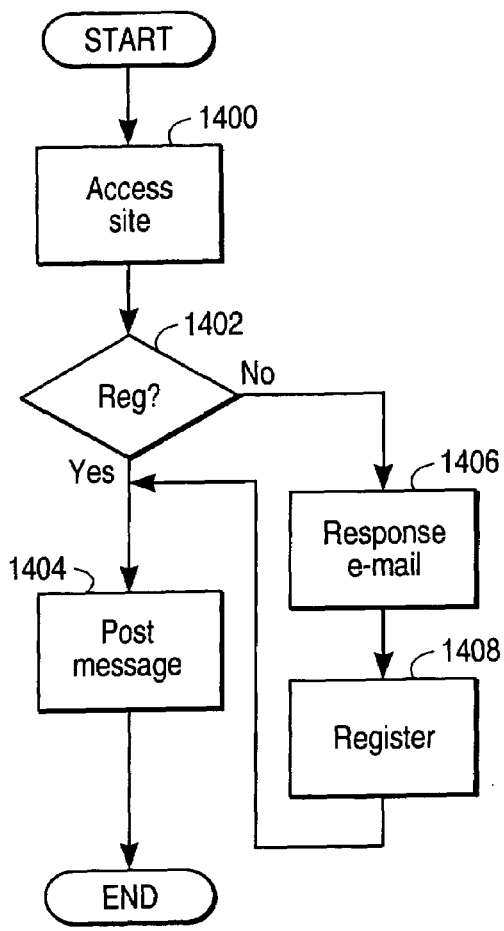
FIG. 10 is a flowchart illustrating system operation according to another embodiment of the invention.

A yet further embodiment of the invention permits a local server that is hosting the site to provide the alias relay service. In this method, the users of the bulletin board or chat room are not allowed access until and unless they register with an alias. Turning now to FIG. 10, this process is illustrated in a flowchart. For example, the relay server 102 may host a bulletin board in a known manner. Thus, the CPU 205 is programmed to function as a bulletin board or newsgroup host. In a step 1400, a user may wish to access the bulletin board or newsgroup by posting a message and therefore accesses the appropriate web page in a known manner. The user may compose a message and attempt to post the message to the relay server. In a step 1402, the CPU 205 intercepts the posted message and accesses the verification database to determine whether the user is a registered user. If the user is a registered user, the relay server will post the message in a known manner with the user's alias e-mail address according to the present invention, in a step 1404. If, however, the relay server 102 had determined that the user was not, in fact, a registered user, in a step 1402, the relay server 102 sends to the user a response, containing the URL of the log in or registration page, in a step 1406. Then, the user may click the hypertext and log in to the web page to register for access to the bulletin board, in a step 1408, in a manner similar to that described above. Once the user is registered, the message will be posted to the board.

Finally, in addition to or in lieu of providing an e-mail alias, a spam deterrent system may require that incoming e-mails to registered users be accompanied by a token or password or other indicia demonstrating that the sender is authorized. The user may thus register with the relay service in a manner similar to that described above, though without necessarily receiving an e-mail alias. In particular, the user obtains a password or token which is associated with the user and stored by the CPU 205 in one of the databases in the storage unit 250. Then, when a third party attempts to send an e-mail to the user, the third party will have to also send the password or token. For a example, the token may accompany the third party sender's e-mail in the body or the header of the message, or as an attachment, or even as an accompanying, separate message. In the latter case, for example, the CPU 305 may be programmed to send a separate e-mail message containing the authorization.

Figure 11:
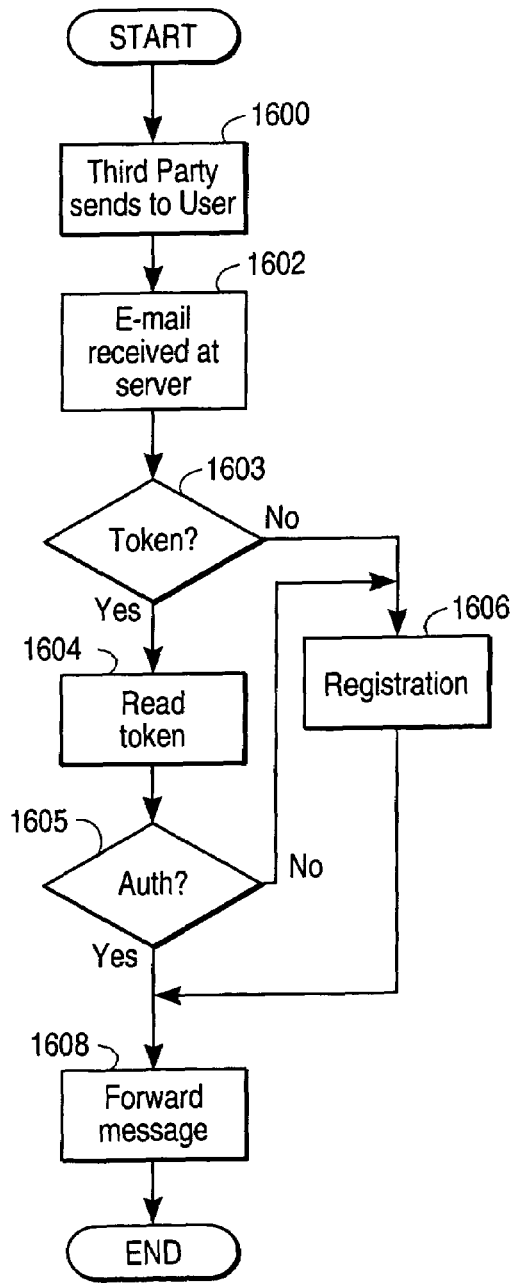
FIG. 11 is a flowchart illustrating operation of another embodiment of the invention.

Operation of this embodiment of the invention is illustrated in greater detail in FIG. 11. In particular, in a step 1600, a third party attempts to send an e-mail to a registered user. The user may have registered in a manner similar to that described above, though without necessarily registering an e-mail alias. Further, the user may have provided the authorization code or token to the third party sender. In a step 1602, the third party sender's e-mail to the registered user is received at the server 102. The server 102's CPU 205 determines whether an authorization token or password is present in a step 1603. For example, the CPU 205 may read a predetermined portion of the third party sender's e-mail for a password or otherwise determine if an authorization accompanies the third party sender's message. If not, then in a step 1606, a registration mode is entered and the e-mail is prevented from being sent to the user until after the third party is duly registered. The registration mode may be similar to any of the methods described above and may allow the third party to obtain an authorization token or code, which is then associated with the message.

If, however, a token or authorization is determined to be present, then in a step 1604, the token or password is actually read. In a step 1605, the read password is compared to the authorizations in the verification database 270 to determine whether a match is found. If so, then the third party sender's e-mail is forwarded to the user. However, if the third party sender is not authorized, then in a step 1606, the third party sender is given the opportunity to register. Only after the third party sender is registered will the e-mail go through to the user.

What is claimed is:

1. A method for processing e-mail, comprising:
providing a user with an e-mail alias, said e-mail alias corresponding to said user's e-mail address;
intercepting third party email directed to said user's e-mail alias;
prompting a third-party sender to enter an authorization prior to forwarding said e-mail; and
forwarding said third party e-mail to said user's e-mail address only if said third party is identified as an authorized user.

2. A method according to claim 1, said intercepting including transmitting a response e-mail to said third party if said third party is not an authorized user.

3. A method according to claim 2, said response e-mail identifying a web site at which said third party may register to become an authorized user.

4. A method according to claim 3 further including limiting a number of e-mails an authorized user may send to another authorized user.

5. A method according to claim 1, including providing a web-based form for said third party to enter a message, said message converted to e-mail addressed to said e-mail alias.

6. A telecommunications server, comprising;
a central processing unit (CPU) programmed to send and receive e-mail; and
a data storage unit for storing one or more e-mail aliases for one or more e-mail users, wherein said CPU is programmed to prompt a sender of email to said e-mail aliases for an authorization and said CPU is programmed to intercept e-mail sent to said e-mail aliases if a sender is not a registered user and said CPU is programmed to forward an e-mail addressed to an e-mail alias to an actual e-mail address only if the sender and recipient are registered users.

7. A telecommunications server according to claim 6, wherein said CPU is programmed to forward said e-mail sent to said e-mail alias to a user's e-mail address if said sender is an authorized user.

8. A telecommunications server according to claim 7, wherein said CPU is programmed to send a response e-mail to said sender if said sender is not an authorized user, said response e-mail identifying a web site at which said sender may register to become an authorized user.

9. A telecommunications server according to claim 6, wherein said CPU is programmed to allow a sender to enter said email into a web page form.

10. A telecommunications server according to claim 6, including a cryptographic processor for encrypting information sent to and from said CPU.

11. A telecommunications server, comprising:
   a central processing unit (CPU) programmed to send and receive e-mail; and
   a data storage unit for storing one or more e-mail authorizations for one or more e-mail users, wherein said CPU is adapted to prompt a sender of e-mail for authorization and said CPU is programmed to intercept e-mail sent to said e-mail users if a sender is not an authorized user and said CPU is programmed to forward an e-mail addressed to an e-mail alias to an actual e-mail address only if the sender and recipient are authorized users.

12. A telecommunications server according to claim 11, wherein said CPU is programmed to forward said e-mail to a user's e-mail address if said sender is an authorized user.

13. A telecommunications server according to claim 12, wherein said CPU is programmed to send a response e-mail to said sender if said sender is not an authorized user, said response e-mail identifying a web site at which said sender may register to become an authorized user.

14. A telecommunications server according to claim 11, wherein said CPU is programmed to allow a sender to enter said e-mail into a web page form.

15. A telecommunications server according to claim 11, including a cryptographic processor for encrypting information sent to and from said CPU.

16. A telecommunications server according to claim 11, wherein said CPU intercepts said e-mail if an authorization is not included in a body of said e-mail.

17. A telecommunications server according to claim 11, wherein said CPU intercepts said e-mail if an authorization is not included in a header of said e-mail.

18. A telecommunications server according to claim 11, wherein said CPU intercepts said e-mail if an authorization is not included as an attachment to said e-mail.

19. A telecommunications server according to claim 11, wherein said CPU intercepts said e-mail if an authorization is not included in an e-mail accompanying said e-mail.

20. A telecommunication system, comprising:
   a plurality of user terminals coupled to a network and configured to communicate with one another via e-mail, each of said plurality of user terminals having an e-mail address;
   a relay server coupled to said network and having a database for storing e-mail aliases corresponding to said e-mail addresses, such that said relay server forwards e-mail directed to said e-mail aliases to said correspond in e-mail addresses if a sender of said e-mail directed to said e-mail aliases is determined to be an authorized user, wherein said relay server is adapted to require said sender to register with said relay server before said e-mail is forwarded to another registered user such that a communication to said e-mail addresses is allowed only between registered users;
   wherein an e-mail is communicated between registered users only if a recipient has registered a sender as an approved party.

* * * * *